United States Patent [19]
Halpern et al.

[11] 3,738,222
[45] June 12, 1973

[54] SAFETY PIN ASSEMBLY

[75] Inventors: William J. Halpern, Langhorne; Carl A. Damm, both of Upper Black Eddy, Pa.

[73] Assignee: The United States of America as represented by the Secretary of the Navy, Washington, D.C.

[22] Filed: May 12, 1971

[21] Appl. No.: 142,655

[52] U.S. Cl. ............................. 89/1.5 D, 89/1.812
[51] Int. Cl. .................................................. B64d 1/04
[58] Field of Search ................ 89/1.5; 294/83, 137; 89/1.812

[56] References Cited
UNITED STATES PATENTS

| | | | |
|---|---|---|---|
| 2,966,826 | 1/1961 | Cerny | 89/1.5 R |
| 1,396,150 | 11/1921 | Weed | 89/1.5 H |
| 1,385,598 | 7/1921 | Weed | 89/1.5 D |
| 3,266,834 | 8/1966 | Lebguitz | 89/1.5 R |

*Primary Examiner*—Samuel W. Engle
*Attorney*—R. S. Sciascia and Henry Hansen

[57] ABSTRACT

A safety pin system for bomb racks including a pair of spring releasable pin lock and retraction assemblies interconnected via a load dividing pulley reciprocated by a push-pull cable operated by a single release latch with a contoured flag visible when the pins are lockable in the inserted position.

9 Claims, 8 Drawing Figures

PATENTED JUN 12 1973
3,738,222
SHEET 1 OF 3
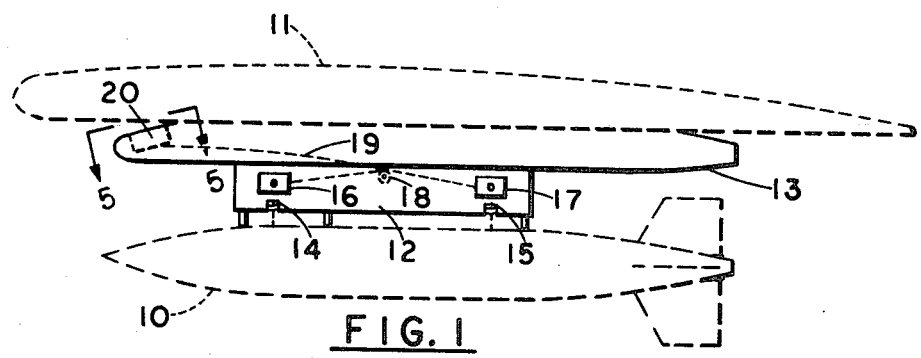
FIG. 1
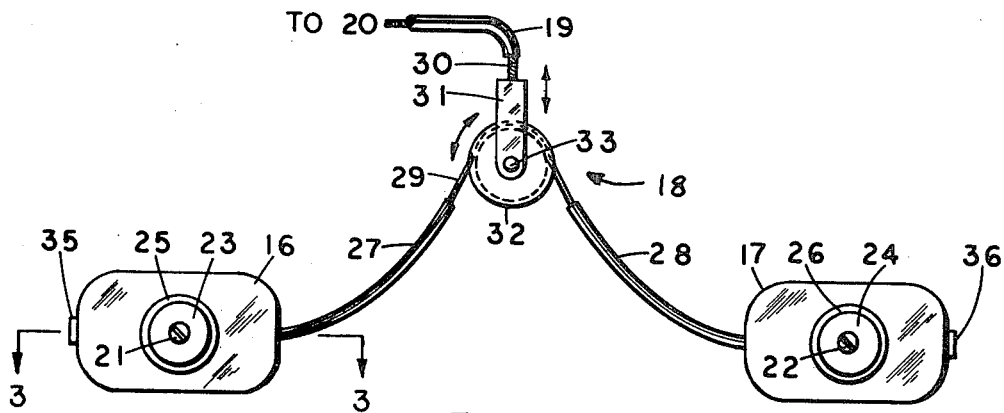
FIG. 2
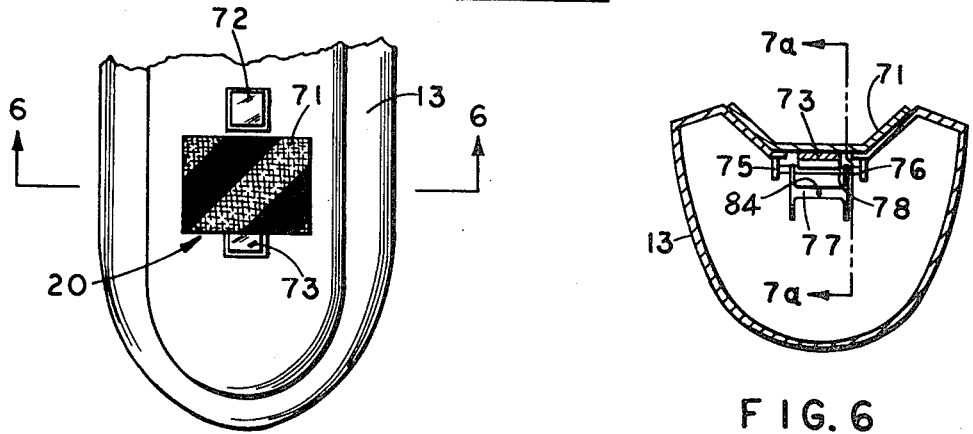
FIG. 5
FIG. 6
INVENTORS
WILLIAM J. HALPERN
CARL A. DAMM
BY Gilbert H. Hennessey
Henry Hansen
ATTORNEYS

INVENTORS
WILLIAM J. HALPERN
CARL A. DAMM
BY
ATTORNEYS

SAFETY PIN ASSEMBLY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates generally to the field of aircraft store ejector ordnance drop racks, and more particularly to improved systems for manipulating safety pins which prevent premature release of ordnance stores from such racks.

In the past, safety pins for locking bomb rack release mechanisms were inserted and removed manually by ground crews. Navy regulations, for example, require that the safety pins be in place while the aircraft is on the flight deck after the bombs are loaded. Before flight, however, the pins must be removed so that during flight the pilot may release the bombs at will or in case of an emergency. The separate pins carry brightly colored warning flags to identify the pin sizes and remind ordnance men to remove the pins from the racks before take-off. Although they have been regularly used for many years, the individual, hand-carried safety pins have a long list of drawbacks. For example, the holes for the pins vary in diameter among different bomb racks. With approximately one hundred known safety pins of varying diameters and lengths currently in use for armament applications, identification of the right pin for a particular rack is difficult. Since the pins are loose, they have to be stored somewhere when removed, and inevitably pins are lost or bent during handling and storage. The worst feature of the old safety pins is the need for individual insertion and removal during multiple bomb loadings. For example, a bomb rack carrying two clusters of three bombs requires 12 individual safety pins. Thus during loading and flight preparation, ordnance men must locate 12 pins for the rack, insert them individually and later remove them individually. In certain aircraft loadings an ordnance man has had to remove and carry away 68 safety pins, just from one airplane. Loose pins which are dropped accidentally on the deck can be sucked up by a jet engine. The same thing can happen to an inserted pin because the flag provides a surface on which the jet suction can work to free the pin, thus un-safing the bomb rack prematurely.

SUMMARY OF THE INVENTION

Accordingly, the general purpose of the invention is to replace the cumbersome individually hand-inserted safety pin system with a new mechanism for manipulating several safety pins at once. Another object of the invention is to eliminate the storage requirements for loose safety pins. A further object of the invention is to provide a single unremovable warning flag to replace the individual flags formerly present on each safety pin.

These and other objects of the invention are achieved and the defects of the prior art overcome by mounting a spring releasable pin assembly at each safety pin station. Each pair of pin assemblies is interconnected via a load dividing pulley and operated by a push-pull cable reciprocated by an aircraft flush latch bearing a contoured, color-coded flag. When the flagged latch handle is upright and visible, safety pins carried by the pin assemblies can be inserted by means of separate pushbuttons. When the latch handle is pushed down in flush locking position, all of the safety pins are automatically released.

BRIEF DESCRIPTION OF THE DRAWINGS

FIG. 1 is a schematic side view of a bomb rack having safety pin assemblies according to the invention;

FIG. 2 is an enlarged plan view of a portion of the safety pin system for the bomb rack of FIG. 1;

FIG. 5 is a fragmentary plan view of a portion of the bomb rack showing the release latch taken along lines 5—5 in the direction of the arrows in FIG. 1;

FIG. 6 is a cross-sectional view of the release latch taken along lines 6—6 in the direction of the arrows in FIG. 5;

DESCRIPTION OF THE PREFERRED EMBODIMENT

Figure 3:
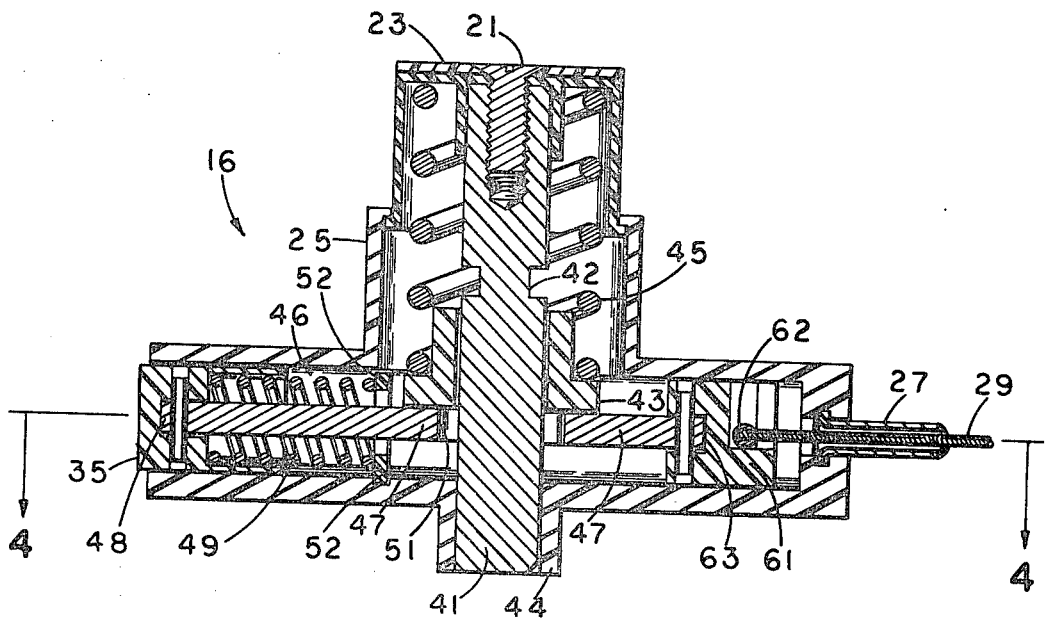
FIG. 3 is a cross-sectional view of one of the pin assemblies taken along lines 3—3 in the direction of the arrows in FIG. 2.

Referring now to FIG. 1 of the drawings, a typical bomb 10 is suspended by means of release hooks 14 and 15 from a bomb standard rack 12 carried by a bomb rack support 13 secured to the underside of an aircraft wing 11. It will be understood that several racks 12 may be carried by a single support 13. To prevent premature release of bomb 10 while the aircraft is on the ground or deck, holes (not shown) are provided in rack 12 through which safety pins may be inserted to lock the release hooks 14 and 15. The safety pins are carried by spring-loaded pin assemblies 16 and 17 (FIG. 2) activated by a release latch mechanism 20 located on the forward end of support 13.

Figure 4:
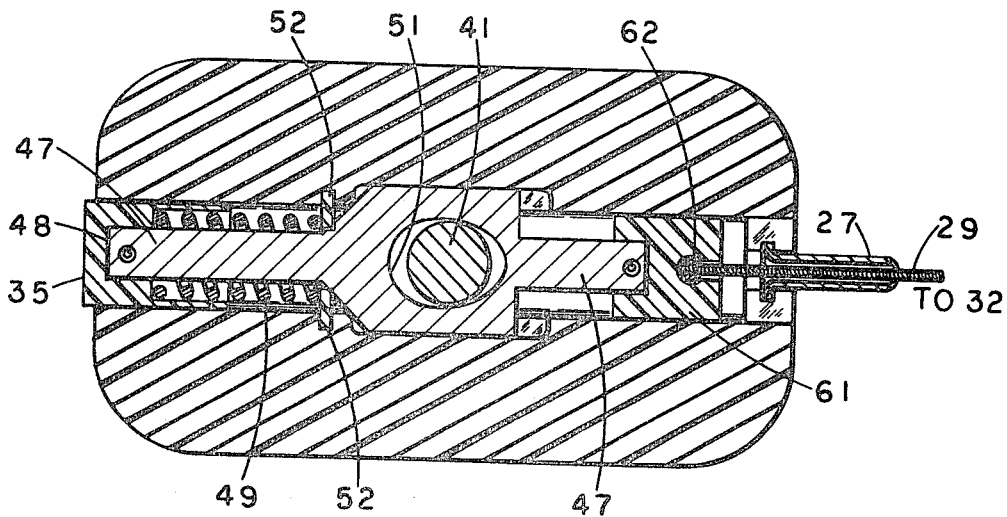
FIG. 4 is a cross-sectional view taken along lines 4—4 in the direction of the arrows in FIG. 3.

Referring to FIG. 3 for the details of pin assembly 16, identical to assembly 17, a body formed of high impact plastic or other suitable material is formed with a neck portion 25 slidably receiving a pushbutton 23 having a collar which fits around metal safety pin 41 secured to button 23 at the top by means of a screw 21. Along the shaft of pin 41 there is an annular detent notch portion 42 of reduced diameter. Button 23 carrying pin 41 is urged outwardly (upward in FIG. 3) by axial spring 45 seated against a ring collar 43 slidably receiving pin 41. Neck portion 25 and button 23 have interlocking rims acting as a limit stop. A sliding detent bar 47 is disposed transversely to pin 41 in the body of assembly 16. Referring to FIG. 4, bar 47 has an egg-shaped slot 51 through which pin 41 passes. Slot 51 has a narrow end whose width corresponds to or approximates the diameter of notch portion 42. When the portion 42 of pin 41 is aligned with bar 47, bar 47 is free to move leftward under the action of a spring 49 thereby engaging notch portion 42 and preventing further movement of pin 41. The end 48 of bar 47 is connected to an auxiliary release button 35 slidably received in a transverse channel in the body of assembly 16. Spring 49 is disposed about bar 47 seated against a spring retaining ring 52 and bearing against the inner surface of button 35. The other end 63 of bar 47 is secured in a piston member 61 sliding in the body of assembly 16 and having a keyhole slot for receiving the balled end 62 of a steel cable 29. Cable 29 is slidably carried within a fixed conduit 27 having a flared end retained in the body of assembly 16.

Referring again to FIG. 2 cable 29, common to both pin assemblies 16 and 17, is slidably carried in respective conduits 27 and 28. Cable 29 is exposed between the adjacent ends of conduits 27 and 28 and passes over a pulley 32 in a junction assembly 18. Pulley 32 is rotatable about an axle 33 connected to a yoke 31 which is reciprocated by another cable 30 leading through a fixed conduit 19 to release latch mechanism 20. Junction assembly 18 serves to evenly distribute the load from cable 30 to pin assemblies 16 and 17. Thus, for each double safety pin rack 12, there would be one junction assembly 18.

In FIG. 5 release latch mechanism 20 is provided by an aircraft-type flush latch having a release pushbutton 72 and a latch handle 73 with a warning flag 71 affixed thereto. Release assembly 20 may be located at any convenient location. Flag 71 which can have conventional yellow and black stripes on both sides is shaped to conform with the adjacent contour of support 13, which in this case is a shallow trough with angled sides.

Figure 7A:
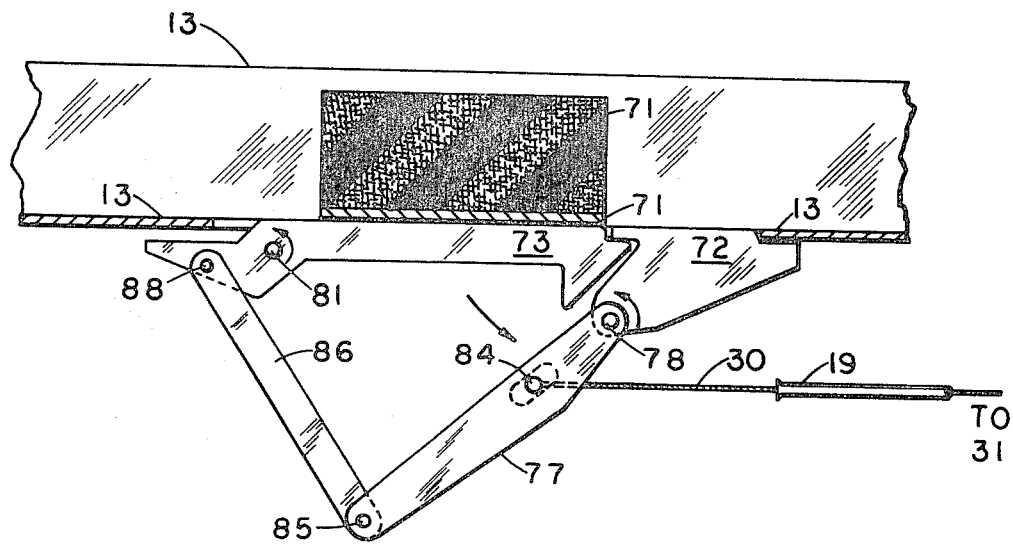
FIG. 7a is a cross-sectional view permitting a side view of the elements of the release latch taken along lines 7a—7a in the direction of the arrows in FIG. 6.
Figure 7B:
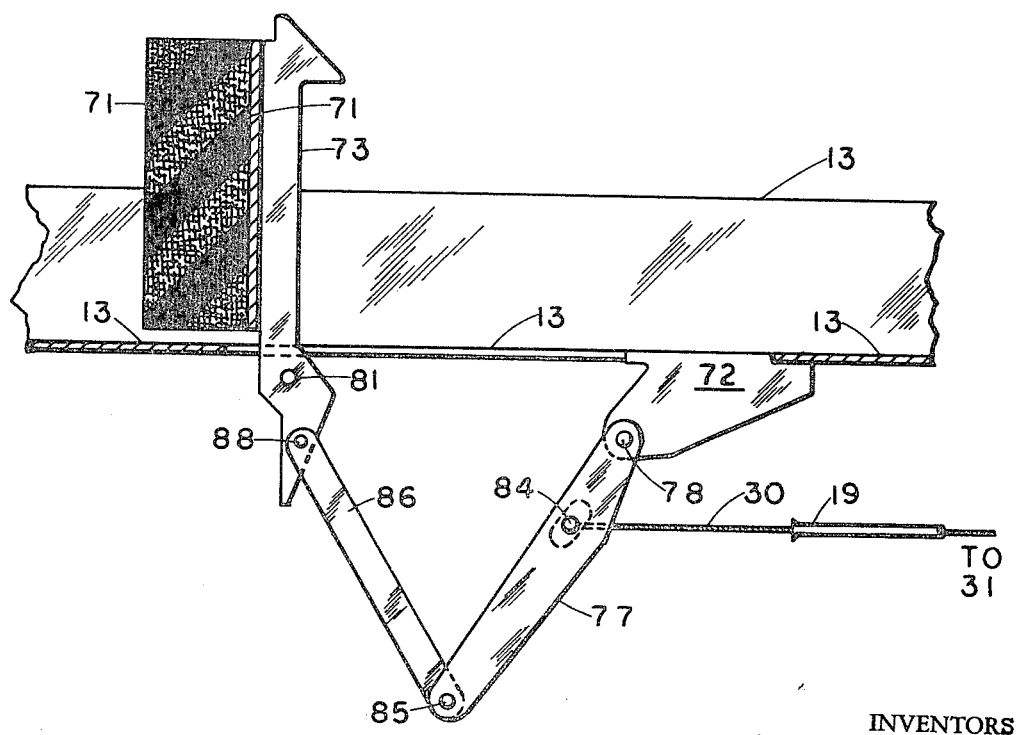
FIG. 7b is a view similar to that of FIG. 7a showing the release latch in the open condition.

Referring now to FIGS. 7a and 7b release button 72 is rotatable about axle 78, hung from supports 75 and 76 attached to rack support 13 (FIG. 6), and urged in the counterclockwise direction by an appropriate spring so that button 72 is normally flush with the adjacent surface of support 13. Latch handle 73, rotatable about a supported axle 81, is urged in a counterclockwise direction by suitable spring means. Handle 73 is flush with rack support 13 when locked down. When pressed downwardly as in FIG. 7a, the beveled end of latch handle 73 strikes the adjacent edge of button 72 and dislocates it until it is free to snap back and engage the end of latch 73. At the opposite end of latch 73, an arm 86 is rotatably attached at one end by means of pin 88 through handle 73. The other end of arm 86 is pivotally connected by means of a pin 85 to an H-shaped cable retainer 77 (FIG. 6) holding the balled end 84 of cable 30. The other end of cable retainer 77 is pivotally connected to axle 78 so that when handle 73 is released by pressing down on button 72, cable 30 is slackened by the lateral (rightward) movement of balled end 84 in cable retainer 77.

In operation, when the release latch mechanism 20 is closed by pressing downward on latch handle 73 until locked in place by button 72, cable 30 is pulled raising junction assembly 18 which distributes the load equally between the slider bars 47 in both pin assemblies 16 and 17. This force opposes that of spring 49 and moves or retains slider bar 47 in the position shown in FIGS. 3 and 4 depending on the position of pin 41. When latch handle 73 is down, slider bar 47 is not free to move and engage slot 42 on pin 41 even when in alignment therewith. Thus when handle 73 is down hindering the full view of flag 71, pin 41 in either assembly 16 or 17 cannot be locked in the inserted position. When handle 73 is released by pressure on button 72 and moved to the upright condition fully exposing flag 71, there is no force opposing that of spring 49 urging slider bar 47 to left (FIG. 3). Thus when either button 23 or 24, on assemblies 16 and 17 respectively, is pressed in by a ground crewman and notch 42 registers with slot 51 in bar 47, bar 47 clicks into engagement with notch 42 locking pin 41 in the inserted condition. While latch handle 73 is up, the safety pins in either assembly 16 or 17 may be independently released by depressing auxiliary release buttons 35 and 36. Pressure on either button 35 or 36 will align the larger portion of oblong slot 51 in bar 47 with pin 41 freeing pin 41 to move out under the action of axial spring 45. When handle 73 is again pressed downward into locking engagement with button 72, any of the safety pins remaining in the inserted condition will be released thereby. Thus the appearance of warning flag 71 in the plainly visible upright condition indicates that one or all of the safety pins may be engaged, although not necessarily due to the auxiliary release buttons.

It should be noted that release latch mechanism 20 can be used to operate several pairs of retraction assemblies 16 and 17 since cable retainer 77 can accommodate a plurality of cables 30. Besides the aircraft-type flush latch 20, other suitable latch or lever devices can be used to reciprocate cable 30. It is important however that the latch mechanism itself provide a visual indication of the condition of the safety pins. The latch thus plays both mechanical and visual roles. It is also important to locate the pivoting end of the latch handle forward of the free end so that the air stream will tend to keep the latch closed during flight. It should be noted that other equivalent mechanical or electromechanical means can be used for retraction assemblies 16 and 17 so long as they provide for independent release of safety pins.

One of the most important advantages of the disclosed safety pin system is that it simplifies the bomb loading operation by eliminating the time consuming task of hand-inserting and removing numerous safety pins before takeoff. In fact, in the past an airplane on an aircraft carrier had to taxi to the launching runway with the safety pins already removed since the removal operation was too time consuming to be performed on the busy runway. With the new system the safety pins can remain inserted up until the last moment before take-off thus eliminating the risk of premature release during taxiing. There are many other striking advantages. For example, since the safety pins fly with the bomb rack, the ground crew no longer must spend time selecting pins of the proper diameter and length. Since the holes in bomb rack 12 are always covered by assemblies 16 and 17, dirt is never allowed to clog the safety pin holes. In the past, with a rack having multiple bombs, it was impossible to see all of the safety pin locations at once. Therefore, one had to walk around the rack to make sure all the pins were pulled, and occasionally one of the pins was overlooked. In the new system a single safety flag is employed having curved or angled sides depending on the adjacent surface. The flag is thus visible from many different angles and provides a quick means of visually checking the safety condition of the bomb racks. Moreover, due to the mechanical relationship of the parts it is impossible to lock any of the pins in the inserted condition without exposing the flag since it is an integral part of the latch system.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A bomb rack of the type comprising a frame, a plurality of release hook means movably mounted in said frame, and apertures formed in said frame for receiving safety pins to lock said release hook means wherein the improvement comprises:

a plurality of safety pin assemblies mounted on said frame about respective ones of said apertures each including guide means for supporting one of said safety pins in sliding axial alignment with said respective aperture, axial spring means operatively disposed about said pin for urging said pin out of said aperture, and releasable detent means adjacent to said pin and transversely movable from one position wherein said pin is locked when inserted in said aperture to another position wherein said pin is released; and a single actuator means carrying a visual warning indicator mounted on said frame and operatively connected to said detent means in each pin assembly for movement thereof between said one and the other position.

2. A bomb rack according to claim 1 wherein the improvement further comprises:

said actuator means including a latch handle mounted at one end in said frame for rotation so as to be flush with the adjacent surface of said frame when in one position; and said indicator including a color-coded flag-like member affixed to said handle and shaped to conform with the contour of said adjacent surface when said handle is in said one position.

3. A bomb rack according to claim 2 wherein the improvement further comprises:

said adjacent surface of said frame and said flag-like member having conforming angled sides.

4. A bomb rack according to claim 2 wherein the improvement further comprises.

said actuator means further including a button having a retaining lip portion mounted on said frame adjacent the other end of said handle for urged rotation about an axis substantially parallel to the axis about which said handle is rotatable so as to be normally flush with the adjacent surface of said frame; and said other end of said handle being beveled for dislocating and engaging the retaining lip of said button, said button lip overlapping a portion of said other end of said handle when said handle is in said one position.

5. A bomb rack according to claim 2 wherein the improvement further comprises:

pulley means having an axle;

a cable connected between respective detent means in a pair of safety pin assemblies and riding over said pulley means; and another cable operatively connected between said handle and said pulley means axle to reciprocate said pulley means thereby evenly distributing a load from said handle to said pair of pin assemblies.

6. A bomb rack according to claim 5 wherein the improvement further comprises:

an annular notch of reduced diameter formed along a portion of the length of each said pin; and each said detent means including a detent bar having an elongated slot for receiving said pin with a narrowed end corresponding to said reduced diameter and mounted for transverse movement relative to said pin from said one position, wherein said pin notch registers with said bar slot, to said other position, and spring means urging said bar to said one position.

7. A bomb rack according to claim 6 wherein the improvement further comprises:

each said pin assembly including an auxiliary release button connected to one end of said bar for independently disengaging said bar from said pin notch to release said pin.

8. A safety pin manipulating and indicating system, comprising:

a frame;

a plurality of safety pins slidable along their lengths in said frame and moveable from a locked to an unlocked position, each of said pins having a reduced cross section along the length thereof;

a plurality of latch means slidable along their lengths normal to said safety pins in said frame and moveable from an unlatched to a latched position engaging said pins in their locked positions, each of said latch means having an opening for receiving said pins therethrough and formed to selectively engage said pins at said reduced cross section in the latched position;

first and second bias means mounted in said frame for respectively urging said pins toward the unlocked position, and said latch means toward the latched position; and control means bearing a visual warning indicator moveable in said frame from a hidden position to a visible position, and operatively connected to said latch means for moving said latch means between the latched and unlatched positions;

whereby the visibility of said indicator denotes the locked or unlocked position of said pins.

9. A system according to claim 8 further comprising:

said visual warning indicator being color-coded and shaped to conform to an adjacent surface of said frame.

* * * * *